INVENTOR
Dean H. Buchtel

Frease & Bishop
ATTORNEYS

*Fig.12*

Aug. 4, 1970     D. H. BUCHTEL     3,522,925
DENTAL CHAIR JACK CONSTRUCTION

Filed April 8, 1968                       9 Sheets-Sheet 6

INVENTOR
*Dean H. Buchtel*

*Frease & Bishop*
ATTORNEYS

Aug. 4, 1970    D. H. BUCHTEL    3,522,925
DENTAL CHAIR JACK CONSTRUCTION
Filed April 8, 1968    9 Sheets-Sheet 7

INVENTOR
*Dean H. Buchtel*

*Frease & Bishop*
ATTORNEYS

United States Patent Office 3,522,925
Patented Aug. 4, 1970

3,522,925
DENTAL CHAIR JACK CONSTRUCTION
Dean H. Buchtel, Canton, Ohio, assignor, by mesne assignments, to The Weber Dental Manufacturing Company, a corporation of Delaware
Filed Apr. 8, 1968, Ser. No. 719,471
Int. Cl. F16m 13/00
U.S. Cl. 248—371
23 Claims

ABSTRACT OF THE DISCLOSURE

A dental chair jack construction comprising a seat support mounted vertically movable upon a laterally spaced pair of scissors-type lift mechanisms. Each scissors-type lift mechanism includes a pair of cross-over arms operated by an individual hydraulic cylinder. The cylinders may be operated in unison for raising and lowering the seat support in horizontal position, or may be operated separately for tilting the seat support laterally toward either side. The seat support is formed of spring loaded telescoping members whereby it may be elongated laterally when it is tilted.

A motor operated pump furnishes fluid to the cylinders through a plurality of solenoid valves, controlled by independent manually operated electrical switches for moving the piston of either or both of the cylinders up or down. Lift arms pivotally connected at their upper ends to the pistons are pivotally connected at their lower ends to intermediate portions of bottom support arms which are pivotally connected at their inner ends to the cylinders. The lower ends of the cross-over arms are pivotally connected to the bottom support arms and their upper ends are pivotally connected to blocks slidably mounted in the upper structure.

BACKGROUND OF THE INVENTION

Field of the invention

The invention relates to jack construction for moving a dental chair vertically and tilting it laterally, and more particularly to such a construction including a laterally spaced pair of scissors-type lift mechanisms, and an individual hydraulic cylinder for independently operating each scissors-type lift mechanism.

DESCRIPTION OF THE PRIOR ART

It is known that jack constructions for dental chairs have been proposed in which there are laterally spaced scissors-type lift mechanisms. For instance, Baxter Pat. No. 575,684, dated Jan. 26, 1897, discloses a dental chair having laterally spaced scissors-type mechanisms. However, only a single hydraulic cylinder is provided for operating both lift mechanisms in unison whereby it is not possible to tilt the seat laterally.

Also, Paulson Pat. No. 3,123,400, dated Mar. 3, 1964, discloses an invalid's chair having laterally spaced scissors-type lift mechanisms. Only a single hydraulic cylinder is provided for raising and lowering the chair. The piston rod and a portion of the cylinder are enclosed within the hollow back of the chair which is rigidly connected to the chair seat. Such a construction would not be feasible for a dental chair as the back of a dental chair must be hingedly connected to the seat.

SUMMARY OF THE INVENTION

In general terms the invention may be briefly described as comprising a jack construction for raising and lowering a dental chair. The improved jack construction includes a pair of laterally spaced scissors-type lift mechanisms mounted at diametrically opposite points upon a rotatable mounting base. A seat support is vertically movable by the scissors-type lift mechanisms, each lift mechanism being independently controlled by an individual hydraulic cylinder.

The seat support is formed of laterally telescoped spring-biased members. By operating both cylinders in unison the seat support may be moved vertically while remaining in substantially horizontal position. By selective independent control of the individual cylinders the seat support may be laterally tilted either to the right or left as desired. The telescoping spring-biased members forming the seat support provide for elongation of the seat support laterally when in tilted position to compensate for the differential in height of the two scissors-type lift mechanisms.

Spring stabilizers are provided opposing lateral tilting of the seat support. Dovetail slides are also provided for holding the scissors-type lift mechanisms in line as they are operated to raise or lower the seat support or tilt it laterally in either direction. Other dovetail slides are provided for operating limit switches that control solenoid valves for the cylinders. The latter dovetail slides are connected to the pistons of the cylinders.

A primary object of the invention is to provide a dental chair jack construction including a laterally spaced pair of scissors-type lift mechanism mounted upon a mounting base, a seat support mounted upon the scissors-type lift mechanisms, and individual independently operated hydraulic cylinders for controlling each scissors-type lift mechanism.

Another object of the invention is to provide such a dental chair jack construction in which the seat support is so constructed that it will be elongated laterally when it is laterally tilted in either direction.

A further object of the invention is to provide a dental chair jack construction of the character referred to in which the seat support includes telescoping spring-biased members.

A still further object of the invention is to provide a dental chair jack construction of this type having spring stabilizers opposing lateral tilting of the seat support.

Another object of the invention is to provide such a dental chair jack construction having dovetail slide means for holding the scissors-type lift mechanisms in line as they are raised and lowered.

A further object of the invention is to provide a dental chair jack construction of the character referred to in which solenoid valves control the admission of fluid to the cylinders.

A further object of the invention is to provide a dental chair jack construction of this type in which slide means connected to the pistons of the cylinders contact limit switches which control operation of the solenoid valves.

These and other objects, apparent from the drawings and following description, may be attained, the above described difficulties overcome and the advantages and results obtained, by the apparatus, construction, arrangements and combinations, subcombinations and parts which comprise the present invention, a preferred embodiment of which, illustrative of the best mode in which applicant has contemplated applying the principles, being set forth in detail in the following description and illustrated in the accompanying drawings.

DESCRIPTION OF THE PREFERRED EMBODIMENT

Reference is now made to the embodiment of the invention illustrated in which similar reference numerals refer to similar parts throughout the drawings.

The jack construction includes a stationary base plate or floor plate 1 (FIGS. 1, 5, 6, 12 and 13) having an upstanding annular flange 2 (FIGS. 3, 4 and 12) upon which is rotatably mounted the mounting base 3 which carries the entire jack structure.

For the purpose of rotatably mounting the mounting base 3 upon the flange 2 of the base plate 1, several (preferably three) equally spaced rollers, one of which is located at 4 (FIG. 12) are journaled upon short shafts 5 located through the flange 2. The lower edge of the depending annular flange 6 of the rotatable mounting base 3 rests upon said rollers.

Figure 6:
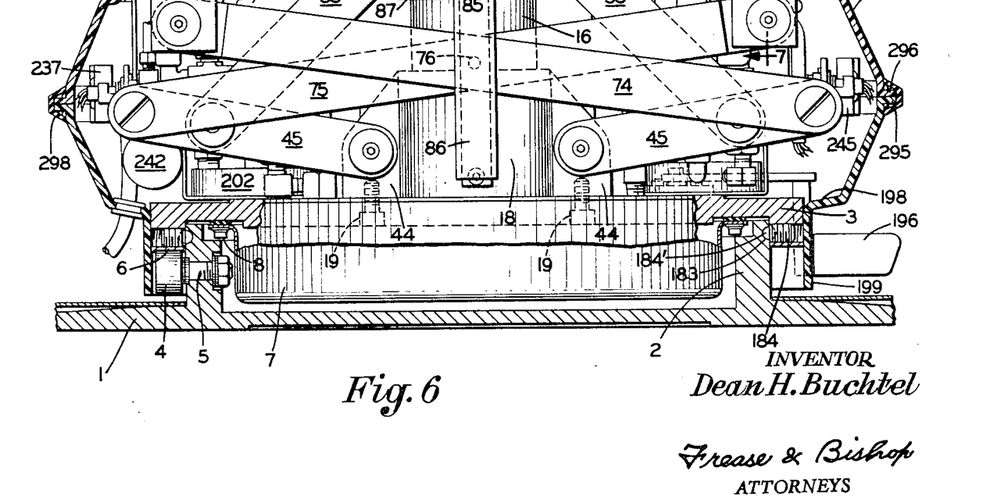
FIG. 6 is a vertical sectional view through the jack taken substantially on the line 6—6, FIG. 5, showing the jack in lowered position.
Figure 12:
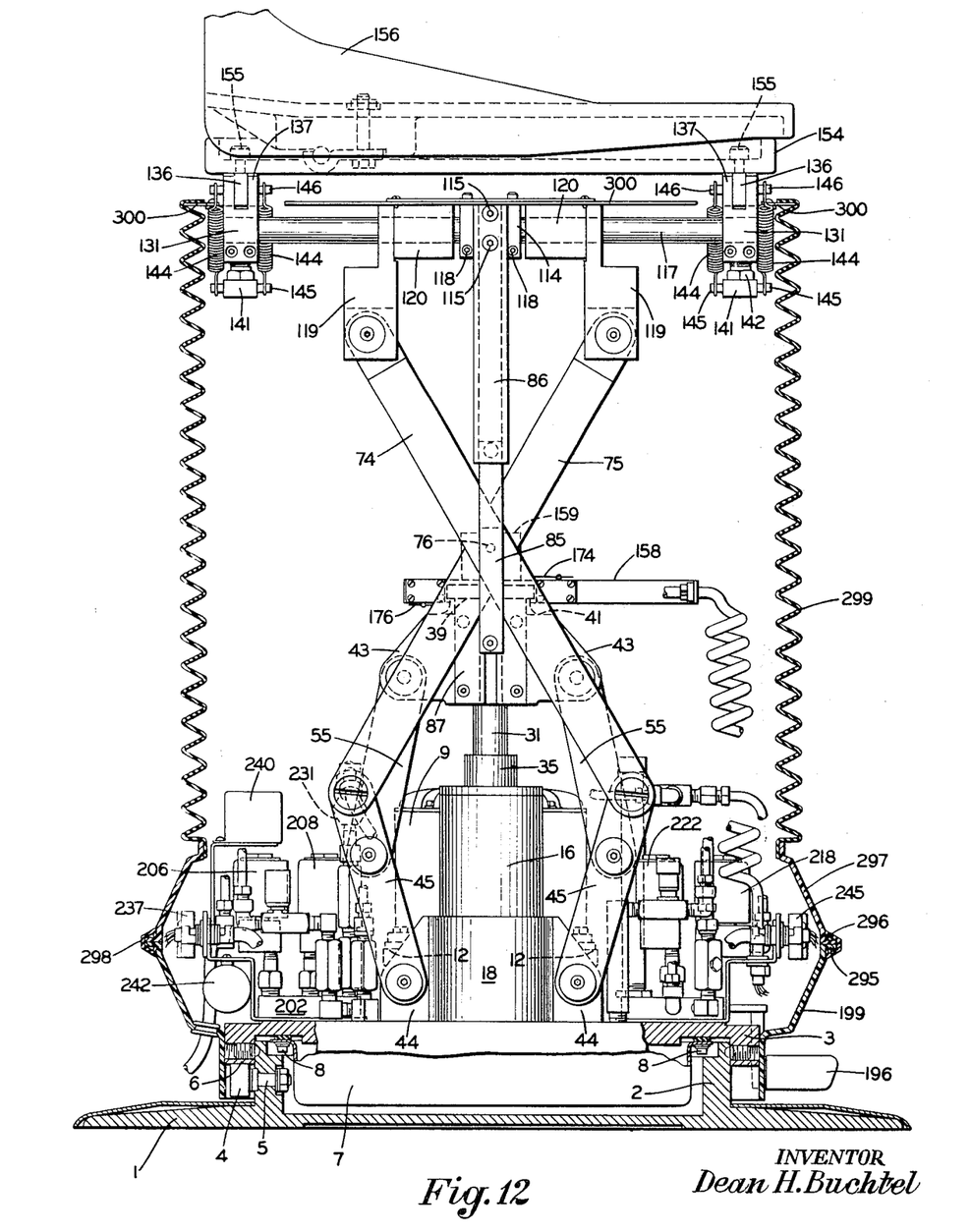
FIG. 12 is a vertical sectional view similar to FIG. 6 showing the jack in raised position.

An oil sump 7 is attached to the underside of the rotatable mounting base 3, as by screws 8, and depends therefrom within the upright annular flange 2 of the base plate as best shown in FIGS. 6 and 12.

A motor 9 (FIGS. 5, 12 and 24) is mounted centrally upon the mounting base 3 for operating the pump 10 in pump casing 11 interposed between the motor and the mounting base. The motor is supported upon the mounting base 3 as by the motor supports 12.

Oil is contained in the sump 7 as indicated at 13 (FIGS. 24 and 26) and is withdrawn therefrom through the inlet suction tube 14 into the pump 10. Any suitable filter or strainer means may be located within the inlet suction tube 14 to prevent dirt and foreign matter from being drawn into the pump with the oil.

Figure 13:
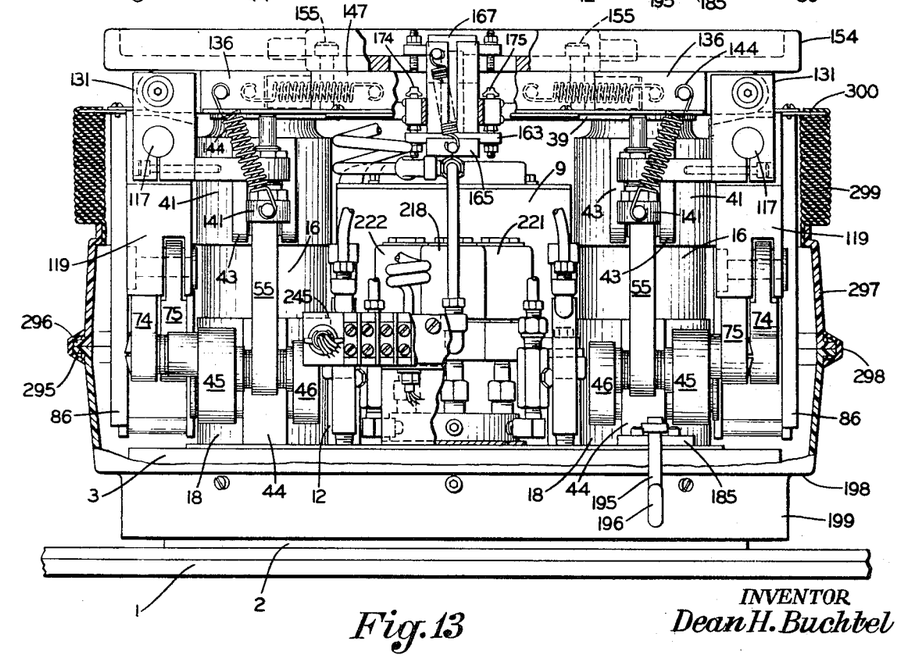
FIG. 13 is a vertical sectional view of the jack taken on the line 13—13, FIG. 5.
Figure 14:
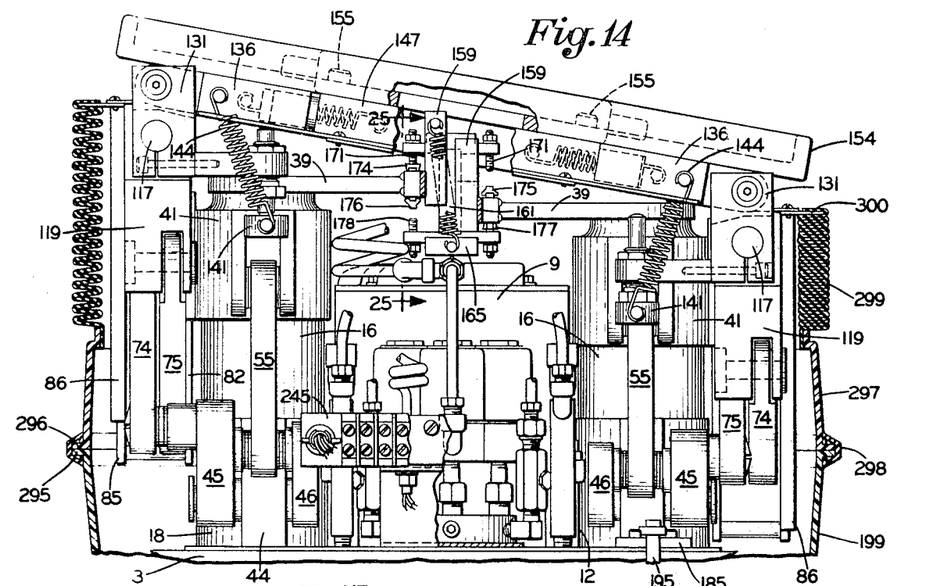
FIG. 14 is a view similar to FIG. 13 showing the jack in tilted position.
Figures 15, 16, 17, 18, 19, 20, 21, 22:
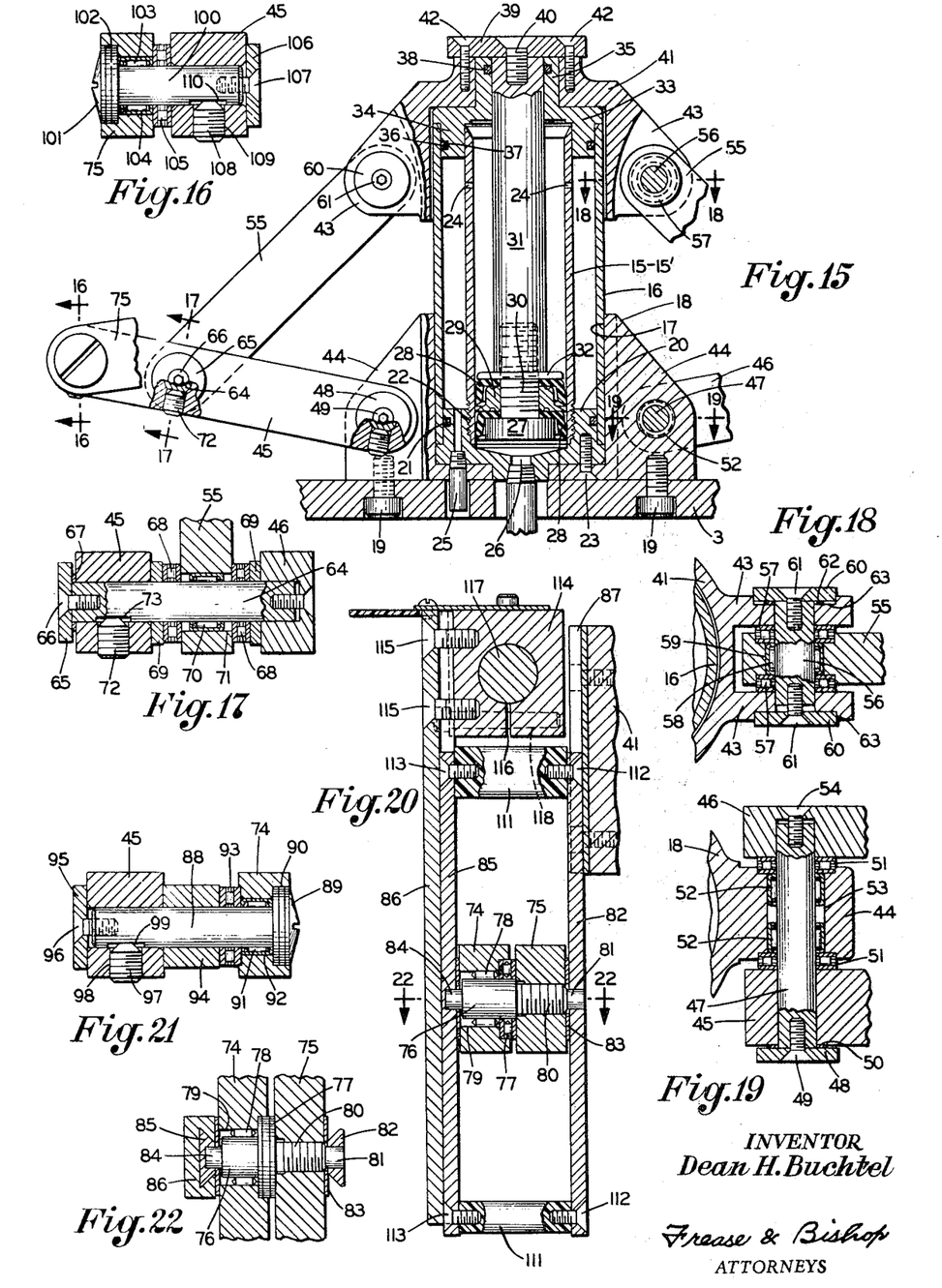
FIG. 15 is a vertical sectional view through one of the fluid cylinders and associated parts, taken on the line 15—15, FIG. 5.
FIG. 16 is a fragmentary sectional view through the pivot joint between one of the cross-over arms and the corresponding bottom support arm, taken on the line 16—16, FIG. 15.
FIG. 17 is a fragmentary sectional view through the pivot joint between one of the lift arms and the corresponding bottom support arm and short support arm taken on the line 17—17, FIG. 15.
FIG. 18 is a fragmentary horizontal sectional view through the pivot joint between the upper end of one of the lift arms and the arm linkage support upon the corresponding piston, taken on the line 18—18, FIG. 15.
FIG. 19 is a fragmentary horizontal sectional view through the pivot joint between the lower end of one of the short support arms and the corresponding cylinder support casting, taken on the line 19—19, FIG. 15.
FIG. 20 is a fragmentary vertical sectional view through the dovetail slide mechanism associated with one cylinder, taken on the line 20—20, FIG. 5.
FIG. 21 is a fragmentary horizontal sectional view of a pivot joint between a cross-over arm and a bottom support arm, taken on the line 21—21, FIG. 5.
FIG. 22 is a horizontal sectional view taken on the line 22—22, FIG. 20, showing the center pivot joint between two of the cross arms.
Figure 26:
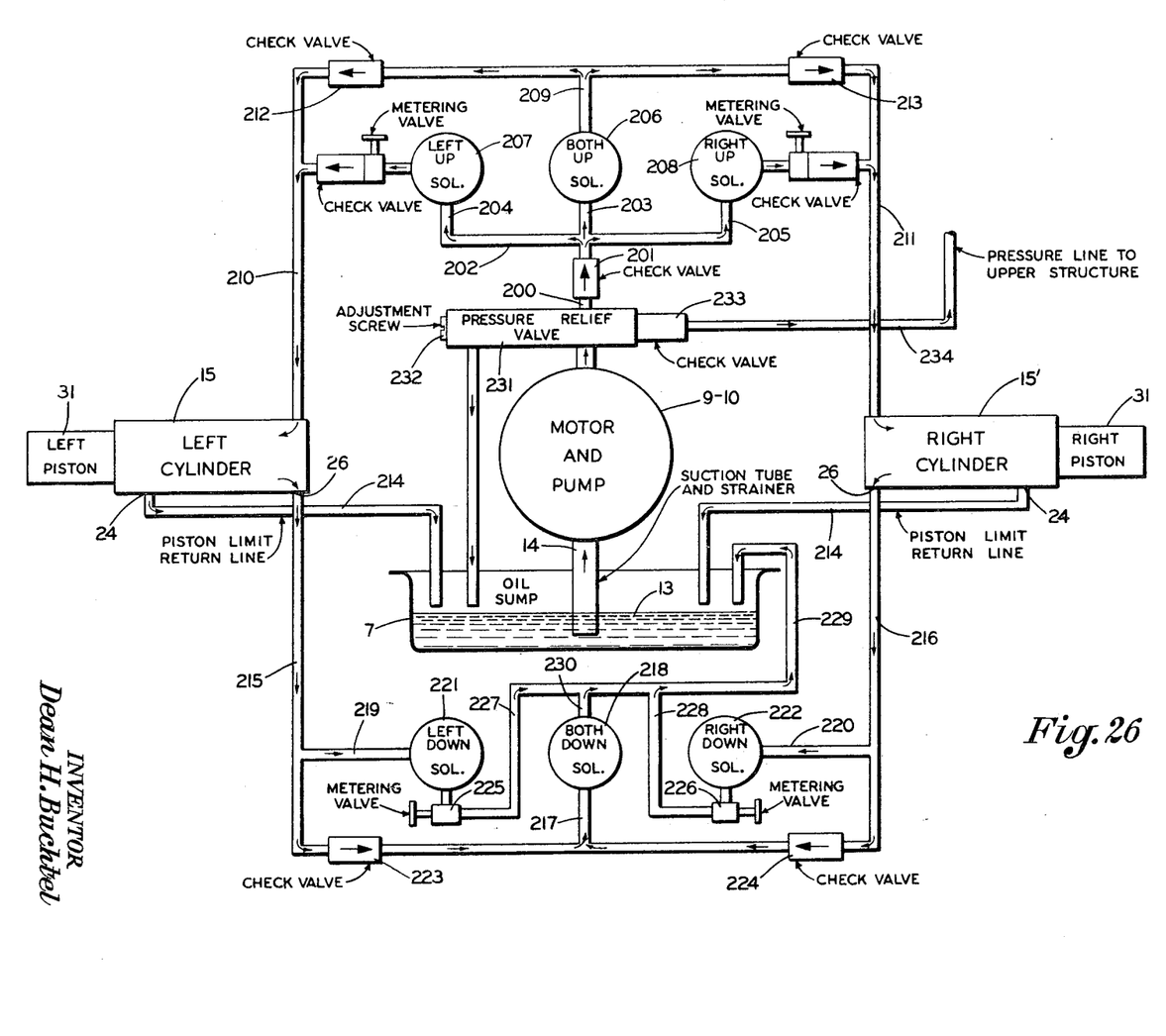
FIG. 26 is a diagrammatic view of the hydraulic system.

Single acting hydraulic cylinders 15 and 15' are mounted on the mounting base 3 on each of two opposite sides of the motor (FIGS. 15 and 26). Each of the hydraulic cylinders is mounted within a cylindrical housing 16 (FIGS. 6, 12, 13, 14 and 15).

Each of the outer cylindrical housings 16, carrying one of the hydraulic cylinders 15 or 15', is located in a correspondingly-shaped cavity 17 in the cylinder support casting 18 (FIG. 15). The cylinder support casting is attached to the mounting base 3 as by cap screws 19.

The lower end of the cylindrical housing 16 may have a drive fit around the exterior of the oil adapter 20 and an O-ring 21, within a suitable annular groove in the oil adapter, forms a fluid-tight joint. The lower end of the cylinder 15 or 15' is threaded into the oil adapter and sealed as indicated at 22. The oil adapter is connected to the cylinder support casting as by screws 23.

There are outlet apertures 24 in each cylinder 15 or 15' near the upper end thereof, to permit oil to pass out of the cylinder into the outer housing 16 and then return through the discharge outlet 25 to the oil sump 7.

Oil under pressure is admitted to the lower end of each cylinder 15 or 15' through an inlet 26 to move the piston 27 upwardly into the cylinder. The connection between the pump 10 and the cylinder inlets 26 will be later described in detail.

The piston 27 has a pair of flexible washers or leathers 28 separated by a spacer 29. The lowermost of the washers 28 is bent downward around the periphery of the piston 27 and the uppermost washer is bent downward around the spacer 29.

The piston has a threaded shank 30 which is threaded into the lower end of the piston rod 31. A metal washer 32 is located around the threaded shank 30 and interposed between the uppermost flexible washer 28 and the lower end of the piston rod 31.

The piston guide support 33 is located at the upper end of the cylinder 15 or 15' and comprises a depending annular flange 34 and a smaller diameter upright tubular portion 35. The upper end of the cylinder 15 or 15' may have a drive fit within the depending annular flange 34 and the upper end of the outer housing 16 may have a drive fit around the exterior of said flange. An O-ring 36 located in an annular groove 37 in the flange 34 provides a tight joint at this point.

A seal ring 38, of rubber or rubber-like material, surrounds the piston rod 31 within the tubular portion 35 of the piston guide support. One end portion of one of the connecting bars 39 (FIGS. 5, 14, 15 and 23) is attached to the upper end of the piston rod 31 as by the screw 40.

An arm linkage support casting 41 is located around the piston guide support 33 and the upper end portion of the cylindrical housing 16 and is attached to the adjacent cross bar 39 by the screws 42. Spaced pairs of ears 43 are provided on opposite sides of the arm linkage support casting 41. Ears 44 are formed on the cylinder support casting 18 directly below the corresponding pairs of ears 43 on the arm linkage support casting.

A bottom support arm 45 and a short support arm 46 are pivotally connected to each ear 44 by means of a bearing pin 47. A disc 48 is connected to one end of the bearing pin 47 by a screw 49, a lock washer 50 being located between the disc and the bottom support arm 45. Thrust bearings 51 are located around the bearing pin 47 between the sides of the ear 44 and the bottom support arm 45 and short support arm 46. Roller bearings 52 are located around the bearing pin 47 within the bore 53 in the ear 44. A screw 54 connects the short support arm 46 to the adjacent end of the bearing pin 47.

Lift arms 55 are pivotally connected at their upper ends between each pair of ears 43 on the arm linkage support casting 41, by means of a bearing pin 56, as shown in FIG. 18. Thrust bearings 57 surround the bearing pin 56 between opposite sides of each lift arm 55 and the ears 43 and a roller bearing 58 is located around the bearing pin 56 within the opening 59 in the adjacent end portion of the lift arm 55.

Discs 60 are connected to opposite ends of the bearing pin 56 by screws 61. A lock washer 62 may be located between one of said discs and the adjacent surface of the corresponding ear 43. The discs 60 are preferably seated in recesses 63 in the adjacent sides of the arm 43.

The lower end of each lift arm 55 is pivotally connected to an intermediate portion of the corresponding lower support arm 45 and the outer end portion of the adjacent short support arm 46 by a bearing pin 64 as shown in FIG. 17. A disc 65 is connected to one end of the bearing pin 64 by a screw 66, a gasket 67 being interposed between the disc 65 and the bottom support arm 45.

Thrust bearings 68 and spacers 69 are interposed between opposite sides of the lift arm 55 and the bottom support arm 45 and short support arm 46 and a roller bearing 70 surrounds the bearing pin 64 within the opening 71 in the lower end portion of the lift arm 55. A set screw 72 is threaded through a suitable tapped opening in the bottom support arm 45 and contacts the flattened portion 73 of the bearing pin 64.

Each scissors-type lift mechanism includes the outer and inner cross-over arms 74 and 75 respectively (FIGS. 6 and 12) which are pivotally connected together at their central portions by a center pivot pin 76 as shown in FIGS. 20 and 22. A thrust bearing 77 surrounds the pivot pin 76 between the cross-over arms 74 and 75 and a roller bearing 78 is located around the pivot pin 76 within the opening 79 in the outer cross-over arm 74.

The portion of the pivot pin 76 located through the inner cross-over arm 75 is shown of reduced diameter and threaded and locked as at 80. The inner end of this pivot pin may be further reduced, as indicated at 81, and is received in a suitable aperture in the inner dovetail slide member 82, a washer 83 being interposed between the cross-over arm 75 and the dovetail slide 82.

The outer end of the pivot pin may also be of reduced diameter, as shown at 84, and is received within a suitable recess in the outer dovetail slide member 85. The latter member is slidable within the exterior vertical dovetail guide 86 and the slide member 82 is slidable within the interior dovetail guide 87 which is fixed upon the arm linkage support casting 41.

The lower end of each outer cross-over arm 74 is pivotally connected to the outer end of the corresponding bottom support arm 45 by a pivot pin 88 as shown in FIG. 21. The head 89 of the pivot pin may be received in a recess 90 in the cross-over arm 74 and a roller bearing 91 surrounds the pivot pin 88 within a suitable opening 92 in the outer cross-over arm 74.

A thrust bearing with races 93 and spacer 94 is interposed between the bottom support arm 45 and the outer cross-over arm 74, and a disc 95 is attached to the inner end of the pivot pin 88 by a screw 96. A set screw 97 is threaded into a suitable tapped opening 98 in the bottom support arm 45 and contacts a flat portion 99 on the pivot pin 88.

In FIG. 16 is shown the manner in which the lower end of each inside cross-over arm 75 is attached to the outer end of the adjacent bottom support arm 45 by a pivot pin 100. The head 101 of the pivot pin is shown received within a recess 102 in the cross-over arm 75 and the roller bearing 103 surrounds the pivot pin within the opening 104 in the cross-over arm.

A thrust bearing 105 is interposed between the bottom support arm and the cross-over arm. A disc 106 is connected to the inner end of the pivot pin 100 by a screw 107. A set screw 108 is threaded through a tapped opening 109 in the bottom support arm and contacts a flat portion 110 on the pivot pin 100.

As best shown in FIG. 20, spacers 111, which may be made of hard rubber or the like, are located between the inner and outer dovetail slide members 82 and 85, respectively, and connected thereto by the screws 112 and 113 respectively. The upper end of the exterior vertical dovetail guide 86 is attached to the outer side of the corresponding block 114 by screws 115 (FIGS. 6, 12 and 20). The block 114 is split as shown at 116 and clamped upon the cross rod 117 by screws 118.

The upper ends of the outer and inner cross-over arms 74 and 75 respectively are pivotally connected to the similar sliding pivot blocks 119 by means of the bearing cups 120 (FIGS. 5, 6, 10 and 12).

For this purpose each of the sliding pivot blocks is bifurcated as indicated at 121 (FIG. 7) to receive the upper end of the cross-over arm 74 or 75. A bearing pin 122 is located through suitable aperatures in the furcations of the block 119 and a roller bearing 123 is located around the bearing pin 122 within a suitable aperture 124 in the upper end of the cross-over arm.

Figures 7, 8, 9, 10, 11:
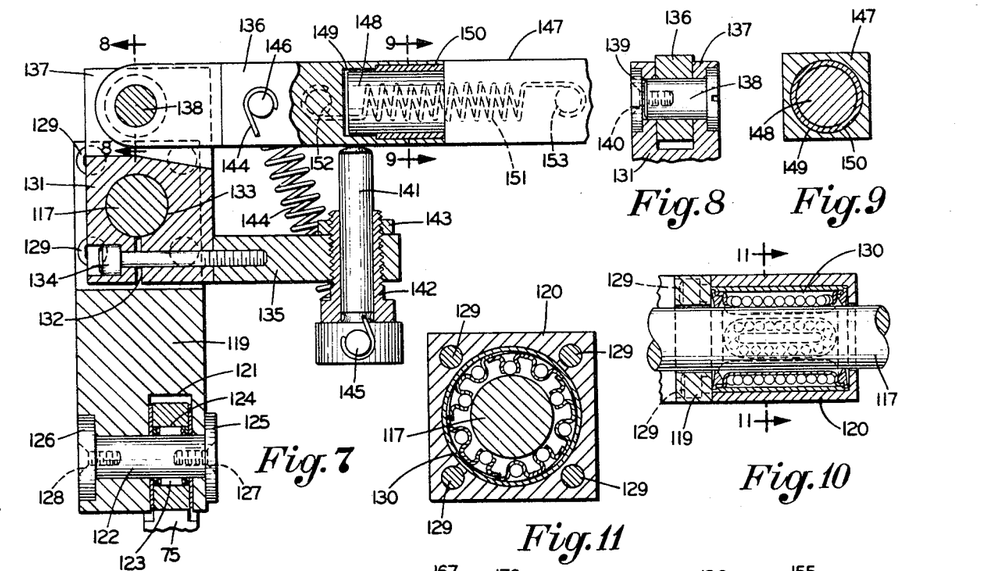
FIG. 7 is an enlarged fragmentary vertical sectional view taken on the line 7—7, FIG. 6.
FIG. 8 is a vertical sectional view taken on the line 8—8, FIG. 7.
FIG. 9 is a sectional view taken on the line 9—9, FIG. 7.
FIG. 10 is an enlarged, fragmentary longitudinal sectional view taken on the line 10—10, FIG. 6, showing one of the linear bearings for one of the cross shafts.
FIG. 11 is a further enlarged transverse section through the linear bearing taken on the line 11—11, FIG. 10.

Discs 125 and 126 are connected to opposite ends of the bearing pin 122 by screws 127 and 128 respectively. Each bearing cup 120 is connected to the corresponding sliding pivot block 119 by screws 129 and contains a linear bearing 130 of conventional design.

A corner block 131 (FIGS. 5, 6, 7, 12, 13 and 14) is fixed upon each end of each cross rod 117. As best shown in FIG. 7, the lower end of each corner block is slotted as shown at 132, the slot extending upward to a circular opening 133 which fits upon the cross rod 117. Cap screws 134 are provided to clamp the slit portion of the block 131 together so as to mount the same tightly upon the corss rod 117. The screws 134 also attach the bracket 135 to the block 131.

A connecting link 136 (FIGS. 5, 6, 7, 12, 13 and 14) is pivotally connected to the bifurcated upper end 137 of each corner block 131 by a pivot pin 138 (FIG. 8). A disc 139 is attached to the opposite end of the pivot pin 138 from the head thereof by a screw 140.

A leveling pin 141 is vertically adjustably mounted in each bracket 135 means of an adjusting nut 142 vertically threaded through the bracket 135 and held in adjusted position by a locknut 143. A pair of springs 144 is connected at the lower ends to pins 145 in the head of the leveling pin 141, the upper ends of the springs being connected to pins 146 in the connecting link 136 so as to normally urge the connecting link 136 downward into contact with the leveling pin 141.

A mounting bar 147 (FIGS. 5, 7, 13 and 14) connects each pair of connecting links 136. As best shown in FIG. 7, the mounting bar has a reduced portion 148 at each end received within a socket 149 in the adjacent connecting link, bushing 150 being shown in the socket. Springs 151, connected to pins 152 and 153 on the connecting links and mounting bar respectively, provide a telescoping construction to compensate for tilting, as indicated in FIG. 14.

A seat saddle adapter 154 (FIGS. 6, 12, 13 and 14) is connected to the mounting bars 147 as by screws 155, and a seat frame 156 (FIG. 12), upon which the chair 157 (FIG. 1) is mounted, is attached to the seat saddle adapter 154 in any suitable manner.

Figure 5:
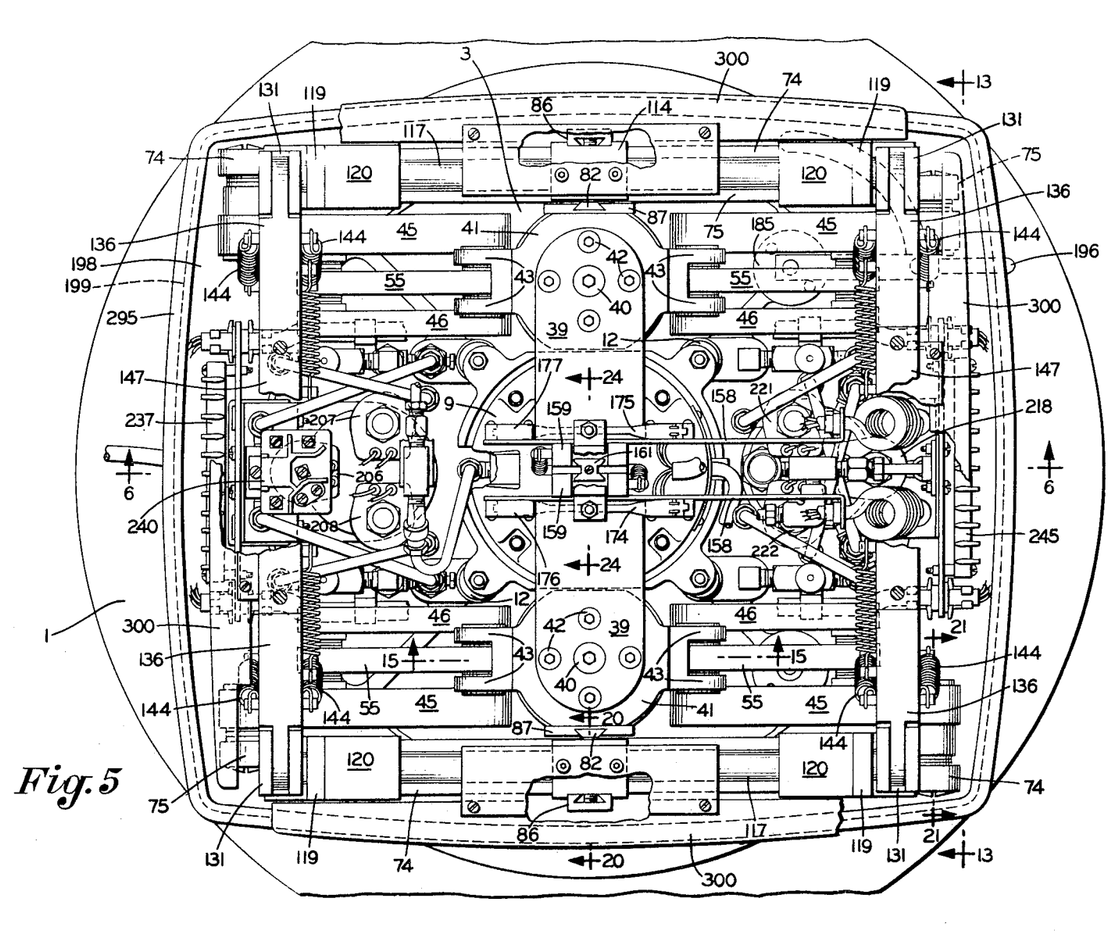
FIG. 5 is a top plan view of the jack with the chair removed therefrom and parts broken away for the purpose of illustration.
Figures 23, 24, 25:
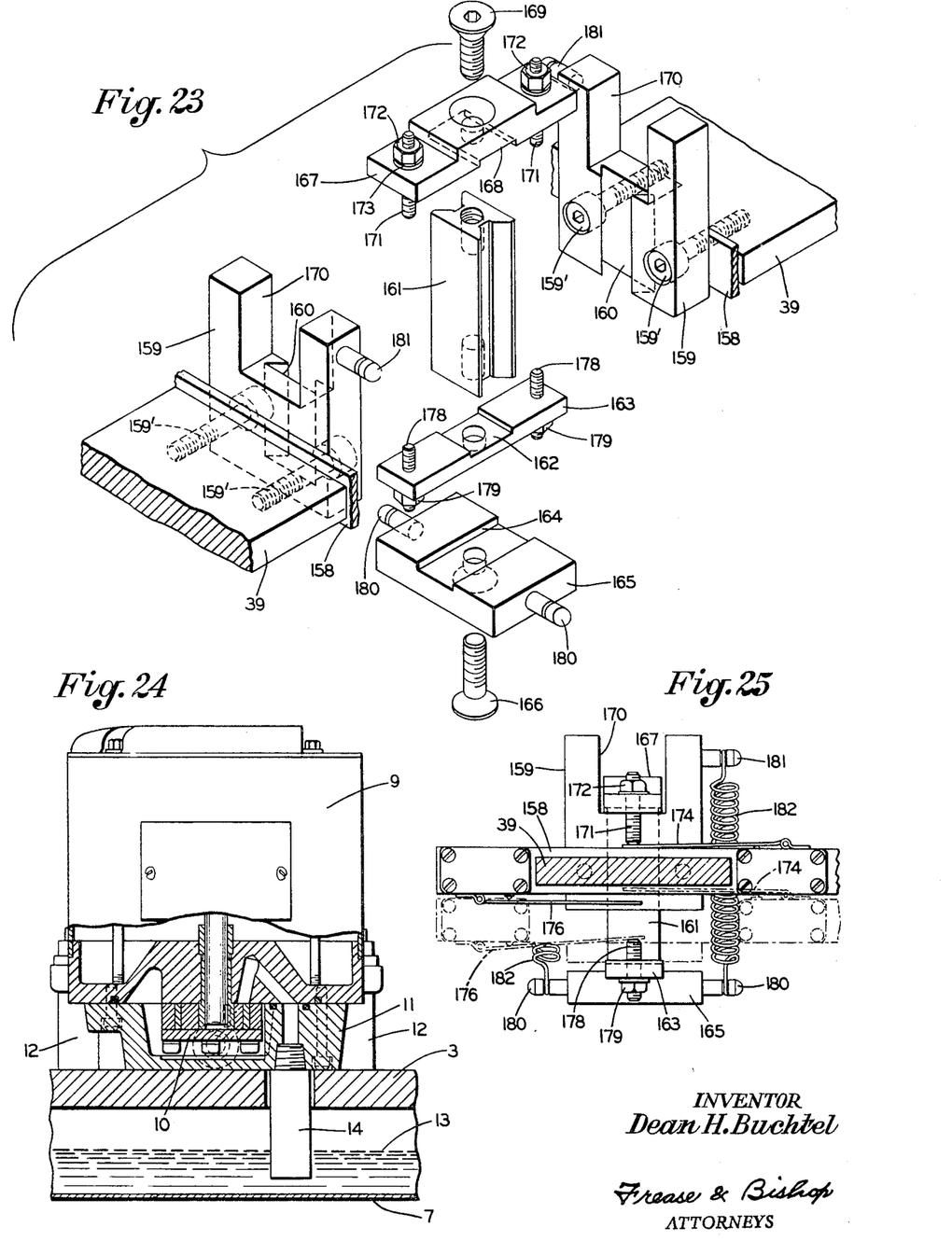
FIG. 23 is an exploded perspective view of the central dovetail slide arrangement and associated parts for controlling tilt.
FIG. 24 is a vertical sectional elevation taken substantially on the line 24—24, FIG. 5.
FIG. 25 is a fragmentary vertical section taken on the line 25—25, FIG. 14.

Referring especially to FIGS. 5, 23 and 25, each connecting bar 39 has a microswitch bracket 158 rigidly connected to its inner end. A dovetail slide block 159, provided with a verticlal dovetail groove 160, is also rigidly connected to the inner end of each connecting bar 39. Screws 159' connect each microswitch bracket 158 and dovetail slide block 159 to the inner end of the corresponding connecting bar 39.

The dovetail slide blocks 159 are slidable upon a dovetail guide 161. The lower end of the dovetail guide 161 is seated in a central notch 162 in the lower adjusting block 163 which is located in the transverse notch 164 in the bottom holddown block 165. A screw 166 connects the dovetail guide 161, the lower adjusting block 163 and the bottom holddown block 165.

The upper adjusting block 167 has a transverse groove 168 in its lower surface which receives the upper end of the dovetail guide 161. A screw 169 connects the upper adjusting block 167 to the upper end of the dovetail guide 161. Opposite ends of the upper adjusting block 167 are received through corresponding notches 170 in the dovetail blocks 159 and are provided with the depending adjusting screws 171 held in adjusted position by locknuts 172 and washers 173. The left "up" and right "up" limit switches 174 and 175 respectively (FIGS. 5, 25 and 27) are mounted upon the upper sides of the corresponding microswitch brackets 158 for engagement by the upper adjusting screws 171. The left "down" and right "down" limit switches 176 and 177 respectively are mounted on the underside of the brackets 158 for contact with the lower adjusting screws 178 adjustably mounted in the lower adjusting bloc 163 and held in adjustment by the locknuts 179.

A pin 180 is located in each end of the bottom holddown block 165 and similar pins 181 are provided near the upper ends of the dovetail slide blocks 159. Coil springs 182 connect the pins 180 and 181. These coil springs thus hold the lower adjusting block 163 in contact with the lower ends of the dovetail slide blocks 159 so that when either block 159 is raised to tilt position, as shown in FIG. 14, the lower adjusting block 163 will be held in contact with the lower end of the other block 159 preventing the dovetail guide 161 from moving.

Figures 1, 2, 3, 4:
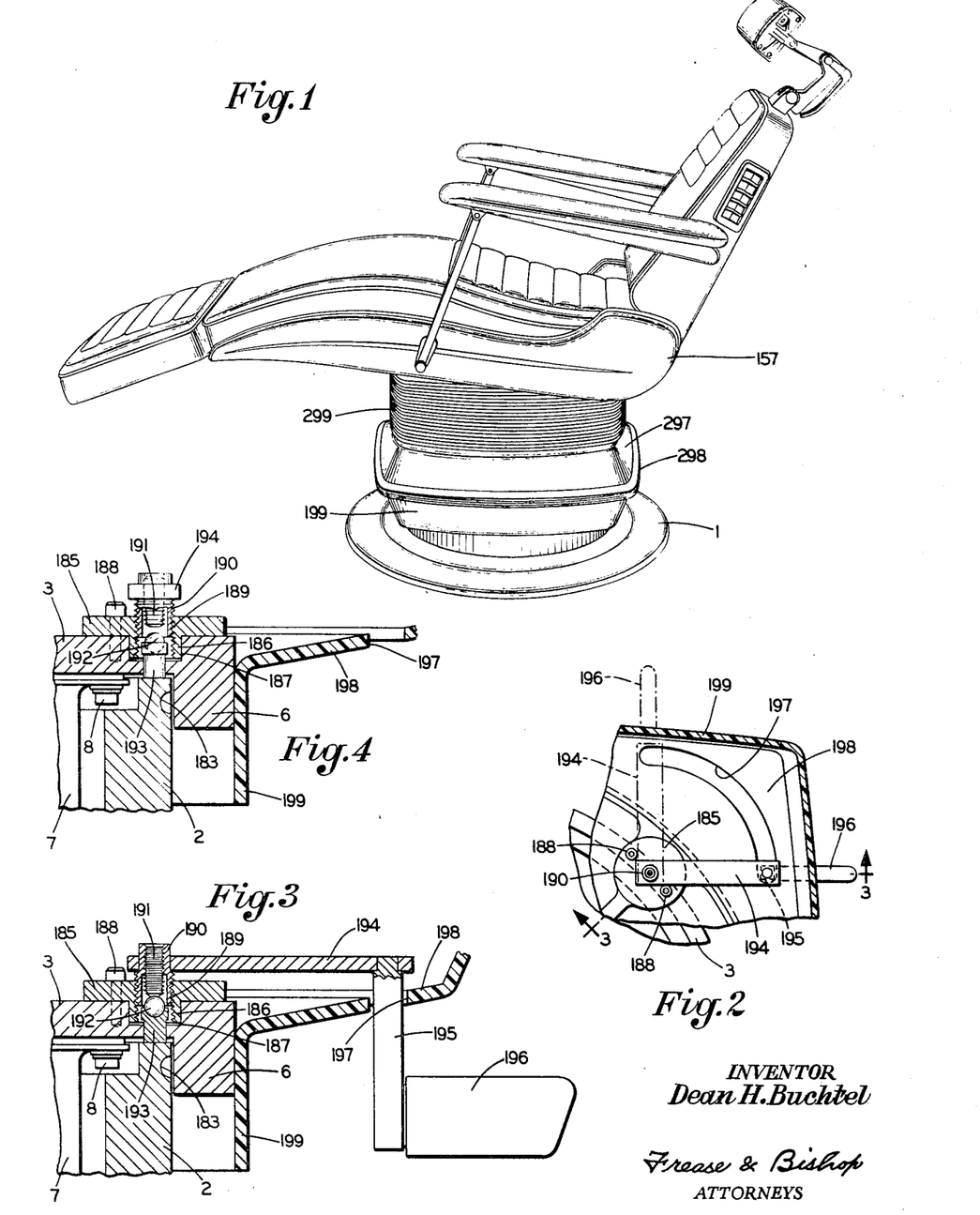
FIG. 1 is a perspective view of a dental chair mounted upon a jack embodying the invention.
FIG. 2 is an enlarged fragmentary horizontal sectional view showing the means for locking the mounting base against rotation upon the stationary base plate, the pedal being shown in locked position.
FIG. 3 is a vertical sectional view taken on the line 3—3, FIG. 2.
FIG. 4 is a view similar to FIG. 3 showing the mounting base in unlocked position relative to the base plate.

Referring to FIGS. 2 to 4 inclusive, and 6, the upright annular flange 2 of the base plate has an annular groove 183 therein. Headless screws 184 are threaded into suitable apertures in the depending annular flange 6 of the mounting base 3 and have steel balls 184' received in the annular groove 183 of the rotatable mounting base to prevent the same from becoming accidentally disengaged from the base plate 1.

For the purpose of locking the rotatable mounting base plate 3 against rotary movement relative to the base plate 1, a locking mechanism is provided, shown in detail in FIGS. 2 to 4 inclusive. This mechanism includes a base lock plate 185 having a depending tubular portion 186 fitted into a suitable recess 187 in the rotatable mounting base 3. The base lock plate is attached to the mounting base as by screws 188 and has the central threaded bore 189. An externally and internally threaded lock stud 190 is threaded into the threaded bore 189 and an adjusting screw 191 is threaded therein and adapted to contact a steel ball 192, as shown in FIG. 3, which is seated in a cup in the upper end of the lock pin 193.

Foot pedal means is provided for moving the adjusting screw 191 from the unlocked position of FIG. 4 to the locked position of FIGS. 2 and 3. This foot pedal means includes the lever 194 fixed at its inner end to the lock stud 190 and extending out beyond the periphery of the depending annular flange 6 of the mounting base 3.

A vertical rod 195 is fixed to the outer end of the lever 194 and a pedal pad 196 is fixed to the lower end of the rod 195.

The rod 195 is movable within the arcuate slot 197 in the upwardly and outwardly inclined flange 198 of the bottom cover 199. As shown in FIGS. 5, 13 and 14, the pedal mechanism is located in position for use by a right-handed dentist. It should be understood that for a left-handed dentist the pedal would be the same distance to the left of the center, as viewed in these figures, with threaded lock stud 190 and threaded bore 189 being left-hand threaded.

As best shown in FIG. 26, oil goes from the pump through a pipe 200, having a check valve 201 therein, to a manifold 202 and thence through inlet pipes 203, 204 and 205 to the solenoid valves 206, 207 and 208 respectively. The solenoid valve 206 admits oil through the pipe 209 to the pipes 210 and 211 which lead to the left and right cylinders 15 and 15' respectively. Check valves 212 and 213 are located in the pipes 210 and 211, respectively, between the pipe 209 and the cylinders 15 and 15' respectively.

The overflow outlet 24 (FIG. 15), the outer housing 16 and outlet 25 to the sump 7 are represented by the piston limit return lines 214 in FIG. 26. Discharge lines 215 and 216 are connected to the outlets 26 of the cylinders 15 and 15' respectively. Both of these discharge lines lead to the pipe 217 which communicates with the solenoid valve 218. Branch pipes 219 and 220 lead from the lines 215 and 216 respectively to the solenoid valves 221 and 222 respectively. Check valves 223 and 224 are located in the lines 215 and 216 respectively between the junctions of the branch pipes 219 and 220 respectively and the pipe 217.

The discharge sides of the solenoid valves 221 and 222 connect with metering valves 225 and 226 respectively which are connected by pipes 227 and 228 respectively with the return line 229 which leads to the sump 7. The discharge side of the solenoid valve 218 is also connected with the return line 229 by pipe 230.

The oil pipe 200 which leads from the pump to the manifold 202 has the pressure relief valve 231 interposed therein with adjustment screw 232. Check valve 233 is interposed between the pressure relief valve and the pressure line 234 leading to the upper structure of the chair which forms no part of this invention.

Figure 27:
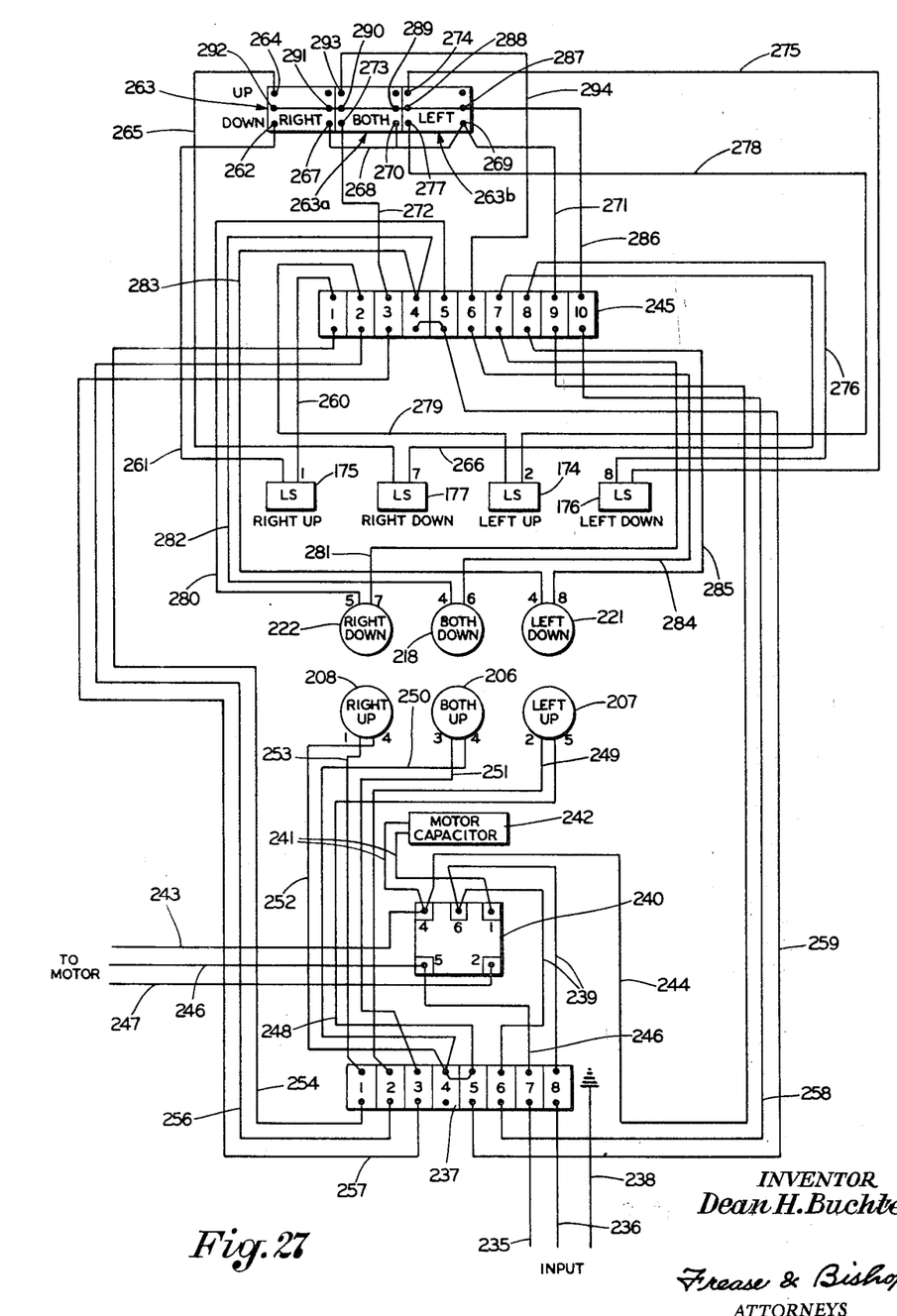
FIG. 27 is a diagram of the electric circuit.

The electric diagram is shown in FIG. 27. Power is supplied to the electric circuits from a three-phase power line comprising the wires 235 and 236 connected to the sections 7 and 8 of the front terminal block 237 and the grounded wire 238. A wire 239 leads from section 8 of the terminal block 237 to terminal No. 6 on the motor relay switch 240 and then back to section 6 of the terminal block 237.

Wire 241 leads from terminal No. 1 of the motor relay switch 240 to the motor capacitor 242 and then back to terminal No. 4 on the motor relay switch. Wire 243 leads from terminal No. 4 on the motor relay switch 240 to the motor, and wire 244 leads from terminal No. 4 on the motor relay switch to section 9 of the rear terminal block 245. Wire 246 leads from section 7 of the front terminal block 237 to terminal No. 5 on the motor relay switch 240 and then to the motor. Wire 247 leads from terminal No. 2 on the motor relay switch 240 to the motor. Wire 248 leads from section 5 of the front terminal block 237 to solenoid valve 207 and wire 249 connects to solenoid valve 207 with section 2 of the front terminal block 237.

Wire 250 leads from section 4 of the front terminal block 237 to the solenoid valve 206 and wire 251 connects the solenoid valve 206 with section 3 of the front terminal block 237. Wire 252 leads from section 4 of the front terminal block 237 to the solenoid valve 208 and wire 253 connects the solenoid valve 208 with section 1 of the front terminal block 237.

Wire 254 leads from section 1 of the front terminal block 237 to section 1 of the rear terminal block 245. Wire 256 leads from section 2 of the front terminal block 237 to section 2 of the rear terminal block 245, and wire 257 leads from section 3 of the front terminal block 237 to section 3 of the rear terminal block 245. A wire 258 connects section 6 of the front terminal block 237 with section 10 of the rear terminal block 245, and a wire 259 connects section 5 of the front terminal block 237 with section 5 of the rear terminal block 245 and also with section 4 of the said rear terminal block.

The right "up" limit switch 175 is connected by wire 260 with section 1 of the rear terminal block 245, and wire 261 leads from limit switch 175 to right "down" terminal 262 of the manually operated switch indicated at 263 which controls raising and lowering the right side of the jack. The right "up" terminals 264 of switch 263 is connected by wire 265 with the right "down" limit switch 177, which is connected by wire 266 with section 7 of the rear terminal block 245. Right "down" terminal 267 of the manual switch 263 is connected by wire 268 with left "down" terminal 269 of the manually operated switch 263b and also with both "down" terminal 270 of the switch 263a. Wire 271 connects left "down" terminal 269 with section 9 of the rear terminal block 245. Wire 272 connects both "down" terminal 273 of switch 263a with section 3 of the rear terminal block 245. Left "up" terminal 274 of switch 263b is connected by wire 275 with left "down" limit switch 176, and wire 276 connects this limit switch with section 8 of the rear terminal block 245. The left "down" terminal 277 is connected by wire 278 with the left "up" limit switch 174, which is connected by wire 279 with section 2 of the rear terminal block 245.

Right "down" solenoid valve 222 is connected by wire 280 with section 5 of the rear terminal block 245 and by wire 281 with section 7 of the rear terminal block. Both "down" solenoid valve 218 is connected by wire 282 with section 4 of the rear terminal block 245 which is also connected by wire 283 with the left "down" solenoid valve 221. Both "down" solenoid valve 218 is connected by wire 284 with section 6 of the rear terminal block 245. Wire 285 connects the left "down" solenoid valve 221 with section 8 of the rear terminal block 245.

A wire 286 connects section 10 of the rear terminal block 245 with the central terminals 287 and 288 of the left "up" and "down" switch 263b, with terminals 289 and 290 of the both "up" and "down" switch 263a and with terminals 291 and 292 of the right "up" and "down" switch 263. The both "up" terminal 293 of the switch 263a is connected by wire 294 with section 6 of the rear terminal block 245.

The bottom cover 199 may be formed of plastic or other suitable material, as indicated in FIGS. 2 to 4 inclusive. This bottom cover has an outturned rim flange 295 at its upper edge (FIGS. 6, 12, 13 and 14) which mates with the similar flange 296 at the lower edge of the upper cover 297 and a trim 298 encloses the flanged edges of the two covers and binds them together. An accordion-type cover 299 is connected at its lower end to the upper edge of the upper cover 297 and at its upper end to attaching strips 300 at the top of the jack structure.

OPERATION

Assuming the jack to be in lowered position, as shown in FIGS. 6 and 13, when it is desired to raise the jack, the switch 263a is moved to the "up" position closing the circuit between the terminals 290 and 293 thereof so as to energize the solenoid of solenoid valve 206 starting the motor and admitting fluid under pressure to both cylinders 15 and 15'. As the piston rods 31 of these cylinders move upwardly, they pass through the lift arms 55 and bottom support arms 45 and 46 operate the cross- over arms 74 and 75 to raise the upper structure, as best shown in FIG. 12.

As long as this switch is kept closed in the "up" position, the entire structure will continue to raise until the pistons 27 clear the outlet apertures 24 in the cylinders, then the pistons will remain at this height, and any further oil pumped into the cylinders will be discharged through the outlet apertures into the outer housings 16 and then through the outlets 25 back to the sump 7. When the switch 263a is released and permitted to move to open position, the jack will remain in this extended position so long as switch 263a remains open.

In order to lower the jack, the switch 263a is moved to "down" position connecting the terminals 289 and 290 thereof with the terminals 270 and 273 respectively, opening the solenoid valve 218 and permitting fluid from both cylinders 15 and 15' to discharge through the pipes 215 and 216 respectively, through the open solenoid valve 218 and through the return pipe 229 to the oil sump 7. As the cylinders are single-acting cylinders, the weight of the chair 157 is sufficient to collapse the cross-over arms and discharge the fluid from the cylinders.

Assuming that the jack has been raised to the desired height and the dentist may wish to tilt the chair laterally either to the left or right, the switch 263b or 263 may be moved to "up" position. By moving the switch 263b to "up" position, connecting the terminals 274 and 288, the motor will be started and solenoid valve 207 will be opened, admitting oil to the left cylinder 15 and tilting the upper structure carrying the chair to the position shown in FIG. 14. If it is desired to tilt the chair to the right, the switch 263 is moved to "up" position, connecting the terminals 264 and 292 opening the solenoid valve 208, starting the motor and admitting oil to the cylinder 15'.

Upward tilting movement of the mechanism is stopped by contact of the right "up" or left "up" limit switches 175 and 174 respectively with the corresponding adjusting screw 171, as shown in FIG. 14, opening the circuit and stopping the upward tilting movement.

When it is desired to again lower the chair to the original level position from that shown in FIG. 14, switch 263b is moved to "down" position making contact between the terminals 277 and 288 and between the termials 269 and 287, opening the left "down" solenoid valve 221 and permitting the weight of the chair to move the parts back to level position. As the lower limit switch 176 or 177, as the case may be, comes into contact with the corresponding adjusting screw 178, a corresponding solenoid valve may be closed and further movement of the apparatus will be stopped at a level position.

If at any time the jack is in tilted position, for example, as shown in FIG. 14, if it is desired to level the chair and raise it higher, this may be done by closing the switch 263a to "up" position making contact between the termianls 290 and 293 thereof starting the motor and pump and opening the solenoid valve 206. The jack will first move to level position and then will move up to the desired height in leveled position.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof ob-

I claim:

1. Dental chair jack construction including a mounting base, a laterally spaced pair of scissors type lift mechanisms mounted upon the base, seat support means mounted upon said scissors type lift mechanisms, an individual hydraulic cylinder included in each scissors type lift mechanism, means for operating both of said cylinders in unison and means for operating each cylinder independently, whereby the seat support means may be moved vertically in level condition or may be tilted laterally in either direction, a base plate upon which the mounting base is rotatably mounted, a base lock plate fixed upon the top of the mounting base, a vertical lock stud threaded in said lock plate, a vertical lock pin located through the mounting plate and having a cup at its upper end, a ball in said cup, a lever fixed to the lock stud, and a pedal connected to the lever for rotating the lock stud to contact the ball and press the lock pin against the base plate for locking the mounting base from rotation upon the base plate.

2. Dental chair jack construction including a mounting base, a laterally spaced pair of scissors type lift mechanisms mounted upon the base, seat support means mounted upon said scissors type lift mechanisms, an individual hydraulic cylinder included in each scissors type lift mechanism, means for operating both of said cylinders in unison and means for operating each cylinder independently, whereby the seat support means may be moved vertically in level condition or may be tilted laterally in either direction, and means causing the seat support means to be slightly elongated laterally when it is tilted laterally in either direction.

3. Dental chair jack construction as defined in claim 2, in which the front and rear sides of the seat support means are formed of telescoping members.

4. Dental chair jack construction as defined in claim 3 in which the telescoping members are spring biased.

5. Dental chair jack construction as defined in claim 3, in which there are stabilizer springs opposing lateral tilting of the seat support means.

6. Dental chair jack construction as defined in claim 2 in which there are interior vertical dovetail guides connected to the outer sides of the piston rods of said cylinders, exterior vertical dovetail guides connected at their upper ends to the central portion of the seat support means, and inner and outer dovetail slides are slidable in said interior and exterior dovetail guides respectively and connected to the pivots of the scissors type lift mechanisms for holding the scissors type lift mechanisms vertically in line.

7. Dental chair jack construction including a mounting base, a laterally spaced pair of scissors type lift mechanisms mounted upon the base, seat support means mounted upon said scissors type lift mechanisms, as individual hydraulic cylinder included in each scissors type lift mechanism, means for operating both of said cylinders in unison and means for operating each cylinder independently, whereby the seat support means may be moved vertically in level condition or may be tilted laterally in either direction, corner blocks pivotally connected to opposite ends of the front and rear sides of the seat support means, cross rods fixed at opposite ends to said corner blocks, sliding pivot blocks slidably mounted upon said cross rods and the scissors type lift mechanisms each including a pair of crossed-over arms pivotally connected together intermediate their ends, the upper ends of the crossed-over arms being pivotally connected to said sliding pivot blocks.

8. Dental chair jack construction as defined in claim 7 in which bottom support arms are pivotally connected at their lower ends to each of the cylinders and pivotally connected at their upper ends to the lower ends of the crossed over arms, and lift arms are pivotally connected at their upper ends to the pistons of said cylinders and are pivotally connected at their lower ends to said bottom support arms adjacent the upper ends thereof.

9. Dental chair jack construction as defined in claim 8 in which an interior vertical dovetail guide is connected to the outer side of each piston rod, an exterior vertical dovetail guide is connected at its upper end to the central portion of each cross rod, and inner and outer dovetail slides are slidable in said interior and exterior dovetail guides respectively, said inner and outer dovetail slides being connected to the pivot pin for said cross over arms.

10. Dental chair jack construction as defined in claim 9 in which said pivot pin is connected to said inner and outer dovetail slides intermediate their ends and spacers are located between the upper and lower ends of said inner and outer dovetail slides.

11. Dental chair jack construction as defined in claim 8, in which the cylinders are mounted in cylinder support castings to which the lower ends of the bottom support arms are pivotally connected and arm linkage support castings are mounted upon the pistons, the upper ends of the lift arms being pivotally connected to said arm linkage support castings.

12. Dental chair jack construction including a mounting base, a laterally spaced pair of scissors type lift mechanisms mounted upon the base, seat support means mounted upon said scissors type lift mechanisms, an individual hydraulic cylinder included in each scissors type lift mechanism, means for operating both of said cylinders in unison and means for operating each cylinder independently, whereby the seat support means may be moved vertically in level condition or may be tilted laterally in either direction, a single solenoid valve controlling the raising of the pistons of both cylinders in unison, separate solenoid valves controlling the raising of each piston independently, a single solenoid valve controlling the lowering of both pistons in unison, and separate solenoid valves controlling the lowering of each piston independently.

13. Dental chair jack construction as defined in claim 12 in which brackets connected to the upper ends of the piston rods carry dovetail slide means and limit switches for independently closing each separate solenoid valve controlling the raising of each piston independently when the seat support means is tilted laterally to the desired extent, and limit switches for independently closing each separate solenoid valve controlling the lowering of each piston independently when the seat support means has been moved from laterally tilted position to level position.

14. Dental chair jack construction as defined in claim 13 in which the dovetail slide means includes a dovetail slide block connected to each bracket, a vertical dovetail guide engaged by said slide blocks, an upper adjusting block fixed to the upper end of said dovetail guide, means on said upper adjusting block for operating the limit switches that control the raising of each piston independently, a lower adjusting block fixed to the lower end of said dovetail guide, and means on said lower adjusting block for operating the limit switches that control the lowering of each piston independently.

15. Dental chair jack construction as defined in claim 14 in which a bottom hold down block is fixed to the lower adjusting block, and springs are connected at their lower ends to said hold down block and at their upper ends to said dovetail slide blocks.

16. Dental chair jack construction as defined in claim 14 in which said dovetail slide blocks have central notches in their upper ends receiving said upper adjusting block.

17. Dental chair jack construction as defined in claim 14 in which the means on said upper and lower adjusting blocks for operating the limit switches are adjusting screws.

18. Dental chair jack construction as defined in claim 12 in which a motor-driven pump supplies fluid from a sump to the cylinders through the solenoid valves which control raising of the pistons, and fluid is discharged from the cylinders through the solenoid valves which control lowering of the cylinders and returned to the sump.

19. Dental chair jack construction as defined in claim 18 in which each cylinder is located within an outer housing, and in which there are outlet apertures in the cylinders to limit upward movement of the pistons therein, and in which there is a fluid return line from the outer housing to the sump.

20. Dental chair jack construction including a mounting base, a laterally spaced pair of scissors type lift mechanisms mounted upon the base, seat support means mounted upon said scissors type lift mechanisms, an individual hydraulic cylinder included in each scissors type lift mechanism, means for operating both of said cylinders in unison and means for operating each cylinder independently, whereby the seat support means may be moved vertically in level condition or may be tilted laterally in either direction, and means whereby after the seat support means has been laterally tilted in either direction, operation of the means for operating both of said cylinders in unison will cause the seat support means to move back to level condition before being moved vertically.

21. Dental chair jack construction including a mounting base, a laterally spaced pair of scissors type lift mechanism mounted upon the base, seat support means mounted upon said scissors type lift mechanisms, an individual hydraulic cylinder included in each scissors type lift mechanism, means for operating both of said cylinders in unison and means for operating each cylinder independently, whereby the seat support means may be moved vertically in level condition or may be tilted laterally in either direction, a cross rod at each side of the seat support means, a corner block fixed to the front and rear end of each cross rod, the front and rear sides of the seat support comprising a connecting link pivotally connected to each corner block, a mounting bar having its ends telescoped in said connecting links, and a coil spring connected to each connecting link and to the adjacent end portion of the mounting bar.

22. Dental chair jack construction as defined in claim 21 in which a bracket is fixed to each corner block below the corresponding connecting link, a leveling pin is carried by each bracket for contact with the corresponding connecting link when the seat support means is in level condition, and coil spring means has opposite ends connected to each connecting link and to the corresponding leveling pin.

23. Dental chair jack construction as defined in claim 22, in which the leveling pin is vertically adjustably mounted on the bracket.

References Cited

UNITED STATES PATENTS

| | | | |
|---|---|---|---|
| 575,684 | 1/1897 | Baxter | 297—374 |
| 755,706 | 3/1904 | Schellenbach | 108—145 |
| 2,471,901 | 5/1949 | Ross | 254—122 |
| 2,821,242 | 1/1958 | Manegold | 248—421 |

EDWARD C. ALLEN, Primary Examiner

U.S. Cl. X.R.

248—421